United States Patent [19]
Sakamoto et al.

[11] 3,965,479
[45] June 22, 1976

[54] MULTI-STYLUS PRINTING HEAD

[75] Inventors: Naraji Sakamoto, Toyonaka; Tatsuo Mitsui, Hirakata; Toshio Hayakawa, Katano, all of Japan

[73] Assignee: Matsieshita Electric Industrial Co., Ltd., Osaka, Japan

[22] Filed: Sept. 16, 1975

[21] Appl. No.: 613,899

[30] Foreign Application Priority Data
Sept. 20, 1974 Japan.............................. 49-109090

[52] U.S. Cl. ....................... 346/139 C; 346/74 ES
[51] Int. Cl.²........................................... G01D 15/06
[58] Field of Search .................... 346/139 C, 74 ES; 29/592, 604

[56] References Cited
UNITED STATES PATENTS
3,808,675    5/1974    Iiyama et al.............. 346/139 C UX

*Primary Examiner*—George H. Miller, Jr.
*Attorney, Agent, or Firm*—Burgess, Ryan and Wayne

[57] ABSTRACT

A multi-stylus printing head cell in which a plurality of styli or electrodes are placed in and bonded to a plurality of parallel grooves formed in one of the major surfaces of a base in such a way that one end portions of the styli may extended out of the base; the exposed conductors of a flat flexible cable are overlaid upon the styli and made into electrical connection therewith; a retaining plate is placed over the exposed conductors; and the legs or side walls of a U-shaped holder are folded inwards over the retaining plate, whereby the base, the styli, the flat flexible cable, the retainer and the holder may be securely held as a unitary construction.

3 Claims, 4 Drawing Figures

PRIOR ART FIG. 1
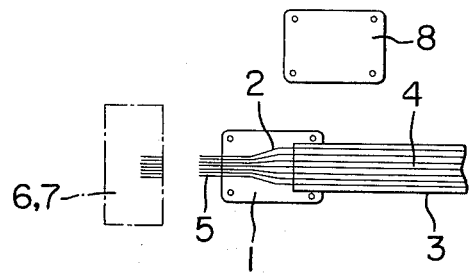
PRIOR ART FIG. 2
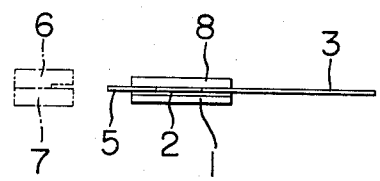
FIG. 3
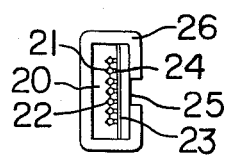
FIG. 4
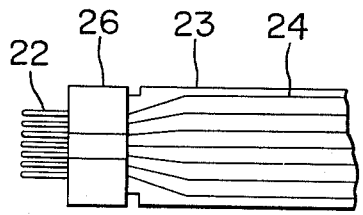

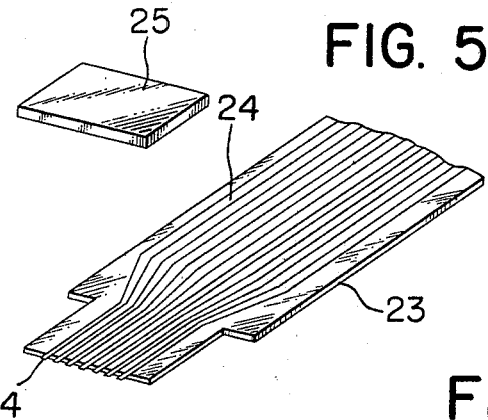
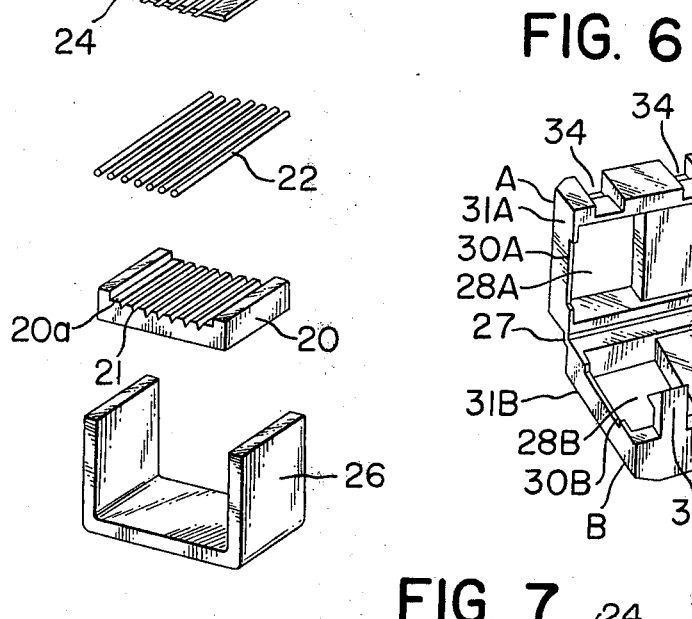
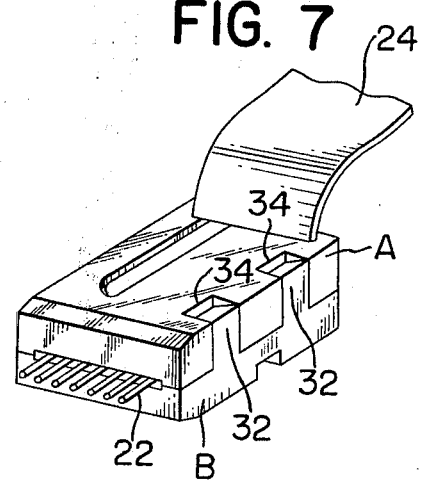

MULTI-STYLUS PRINTING HEAD

BACKGROUND OF THE INVENTION

The present invention relates to a multi-stylus printing head cell of the type having a plurality of needle-shaped electrodes or styli which are electrically separated from each other.

The multi-stylus printing head cells of the type described are used in the electrostatic or electric discharge printers. That is, the printing head cell having a number of $m$ styli arranged in one column is scanned over a recording paper or the like in the transverse direction thereof so that the alpha-numerics may be recorded by the dots of the $m \times n$ dot matrix.

There has been devised and demonstrated a multi-stylus printing head cell of the type in which a ceramic base or support has a plurality of conductors printed upon one major surface thereof and electrically connected at one ends to the conductors in the form of a foil of a flat flexible cable and at the other ends to needle-shaped electrodes or styli. When the styli are attached upon the support and connected to the printed conductors thereupon, jigs must be used in order to hold the styli in parallel with each other. Therefore the prior art printing head cell is complicated in construction, and the fabrication process is also complicated especially because it involves the step for printing the conductors upon the support or base and the steps for connecting the printed conductors on the base not only to the styli but also to the conductors of the flat flexible cable.

SUMMARY OF THE INVENTION

In view of the above, one of the objects of the present invention is to provide a multi-stylus printing head cell simple in construction and assembly.

Another object of the present invention is to provide a multi-stylus printing head cell in which a plurality of electrodes or styli are arrayed and spaced apart from each other with a high degree of accuracy.

A further object of the present invention is to provide a multi-stylus printing head cell in which the styli are directly connected to the conductors of the flat flexible cable, whereby the step for printing the conductors on the base may be eliminated, resulting in the simple assembly.

A further object of the present invention is to provide a multi-stylus printing head cell in which in order to securely hold and accurately space apart the styli from each other by a predetermined distance, they are placed in the parallel grooves formed in one major surface of the base or support, whereby the use of the jigs may be eliminated.

A further object of the present invention is to provide a multi-stylus printing head cell in which a retaining plate or washer is used to press the exposed conductors of the flat flexible cable against the styli so that they may contact with each other under the uniform pressure.

The above and other objects of the present invention may be attained by a multi-stylus printing head cell comprising a base or support made of an insulating material with a shallow recess formed lengthwise in one of the major surfaces thereof, a plurality of parallel grooves being formed in the bottom of said recess, a plurality of electrodes or styli placed in said grooves, respectively, and bonded with an adhesive, a flat flexible cable consisting of an insulator and a plurality of conductors in the form of a foil, the leading end portions of said conductors being exposed from the insulator and overlaid upon said styli so as to attain the electrical connection therewith, respectively, a retaining plate placed upon said leading end portions of said conductors overlaid upon said styli, and a U-shaped holder adapted to hold said base, said styli and said flat flexible cable with the side walls or legs of said U-shaped holder folded inwardly over said retaining plate whereby said base, said styli, said flat flexible cable and said retaining plate may be securely held in position.

BRIEF DESCRIPTION OF THE DRAWING

FIG. 1 is a top view of a prior art multi-stylus printing head cell;

FIG. 2 is a side view thereof;

FIG. 3 is an end view of a multi-stylus printing head cell in accordance with the present invention;

FIG. 4 is a top view thereof;

FIG. 5 is an exploded perspective view thereof;

FIG. 6 is a perspective view of a protective casing; and

FIG. 7 is a perspective view of the printing head cell enclosed in the protective casing shown in FIG. 6.

DESCRIPTION OF THE PREFERRED EMBODIMENT

Prior Art, FIGS. 1 and 2

Prior to the description of the preferred embodiment of the present invention, the prior art multi-stylus printing head cell will be briefly described in order to point out more specifically the defects thereof. Referring to FIGS. 1 and 2, reference numeral 1 denotes a support or base made of ceramic; 2, a plurality of conductors printed and extended lengthwise upon the upper surface of the base 1; 3, a flat flexible cable including a plurality of conductors 4 in the form of a foil and equal in number to the printed conductors 2, the conductors 4 being electrically insulated from each other by an insulating member and electrically connected to the printed conductors 2 on the base 1; and 5, needle-shaped electrodes or styli arranged in parallel with each other and electrically connected to the printed conductors 2 on the base 1.

When the styli 5 are connected to the printed conductors 2, jigs 6 and 7 are used to hold the styli 5 in parallel with each other, and after the styli 5 are connected, a cover or retaining plate 8 is placed upon the base 1 and securely attached thereto.

As described above, the jigs 6 and 7 are required in the fabrication of the multi-stylus printing head cells of the type described. Furthermore, the conductors 2 must be printed on the base 1. Therefore, two steps are required for the electrical connection of the printed conductors 2 with the flexible cable 3 and the styli 5. Thus, the conventional multi-stylus printing head cells are complex in construction, requiring the complicated fabrication steps.

THE INVENTION

Next referring to FIGS. 3, 4 and 5, one preferred embodiment of the present invention will be described. A base or support 20 is made of an insulating material, and has a shallow recess 20a. A plurality of parallel grooves 21 are formed at the bottom of the recess 20a, and a plurality of electrodes or styli 22 are placed in the grooves 21 and firmly bonded with a suitable adhesive. A flat flexible cable 23 has a plurality of conductors in the form of a foil and electrically separated from each other with an insulating member. In the leading end portion which is overlaid upon the styli 22, the conductors 24 are arranged in the same pitch with that of the styli 22 and are exposed from the insulating member. In assembly, the leading end portion of the flat flexible cable 23 is overlaid upon the styli 22 on the base 20 in such a way that the exposed conductors 24 may be made into electrical contact with the styli 22, respectively. Thereafter, a retaining plate or washer 25 is placed upon the leading end portion of the flexible cable 23, and then the legs or side walls of a holder 26 are folded inwardly over the retaining plate 25 so that the base 20, the styli 22, the flexible cable 23 and the retaining plate 25 may be firmly held in position as shown in FIGS. 3 and 4, and that the secure electrical connection between the styli 22 and the conductors 24 of the flexible cable 23 may be attained.

The printing head cell thus assembled is enclosed in a protective casing shown in FIG. 6. The protective casing consists of an upper section A and a lower section B both of which are joined to each other with a hinge 27. The upper and lower sections A and B have recesses 28A and 28B into which is enclosed the holder 26 and stepped portions 29A and 29B between which is interposed the flat flexible cable 23. Two protrusions 32 of the lower section B are adapted to engage with corresponding slots 34 formed in the side wall of the upper section A, and an upright rear protrusion 33 of the lower section B defines with a back recess 35 of the upper section A a passage through which is extended the flat flexible cable 23. Notches 30A and 30B formed in the front walls 31A and 31B of the upper and lower sections A and B define an opening through which are extended the styli 22 as shown in FIG. 7.

In assembly, the holder 26 is placed in the recess 28B in the lower section with the styli extended through the notch 30B and the flat flexible cable 23 placed upon the stepped portion 29B and folded upwardly along the rear protrusion 33. Thereafter, the upper section A is closed with the protrusions 32 engaged with the slots 34. Thus, the printing head cell sub-assembly may be securely enclosed in the protective casing as shown in FIG. 7.

What is claimed is:

1. A multi-stylus printing head cell comprising
   a. a base made of an insulating material with a shallow recess formed lengthwise in one of the major surfaces thereof, a plurality of parallel grooves being formed in the bottom of said recess,
   b. a plurality of electrodes or styli placed in said grooves, respectively, and bonded with an adhesive,
   c. a flat flexible cable consisting of an insulator and a plurality of conductors in the form of a foil, the leading end portions of said conductors being exposed from the insulator and overlaid upon said styli so as to attain the electrical connection with said styli, respectively,
   d. a retaining plate placed upon said leading end portions of said conductors overlaid upon said styli, and
   e. a U-shaped holder adapted to hold said base, said styli and said flat flexible cable with the side walls or legs of said U-shaped holder folded inwardly over said retaining plate whereby said base, said styli and said flat flexible cable may be securely held in position.

2. A multi-stylus printing head cell as set forth in claim 1 further comprising a case for protecting said cell wherein said protective casing having a chamber or space in which is enclosed said holder and an opening through which said styli are extended.

3. A multi-stylus printing head cell as set forth in claim 2 wherein said protective casing consists of an upper section and a lower section which are joined with a hinge, said upper and lower sections are provided with
   a. recesses which cooperate to define said space or chamber into which is enclosed said holder,
   b. stepped portions in continuation with said recesses which stepped portions cooperate to define a passage through which is extended said flat flexible cable,
   c. rear notches formed in the rear walls of said upper and lower sections which notches cooperate to defining an opening through which said flat flexible cable is extended out of said protective casing, and
   d. front notches formed in the front walls of said upper and lower sections which notches cooperate to define an opening through which said styli protrude beyond said protective casing; said upper or lower section have protrusions extended upwardly from the side wall opposed to the side wall hinged to the lower or upper section; and said lower or upper section have engaging slots formed in the side wall thereof opposed to the side wall hinged to the upper or lower section for engagement with said protrusions of said lower or upper section so as to firmly hold said upper and lower sections together.

* * * * *

UNITED STATES PATENT OFFICE
CERTIFICATE OF CORRECTION

Patent No. 3,965,479  Dated June 22, 1976

Inventor(s) Naraji Sakamoto, et al

It is certified that error appears in the above-identified patent and that said Letters Patent are hereby corrected as shown below:

On the title page, please correct the spelling of the name of the Assignee as follows:

Change "Matsieshita Electric Industrial Co., Ltd." to

--Matsushita Electric Industrial Co., Ltd.--

Signed and Sealed this

Twenty-third Day of November 1976

[SEAL]

Attest:

RUTH C. MASON
Attesting Officer

C. MARSHALL DANN
Commissioner of Patents and Trademarks